(12) United States Patent
Sondgeroth

(10) Patent No.: US 11,751,541 B2
(45) Date of Patent: Sep. 12, 2023

(54) ANIMAL COLLAR INCLUDING BUCKLE AND METHOD OF USING SAME

(71) Applicant: PetIQ, LLC, Eagle, ID (US)

(72) Inventor: Theodore L. Sondgeroth, Omaha, NE (US)

(73) Assignee: PETIQ, LLC, Eagle, ID (US)

(*) Notice: Subject to any disclaimer, the term of this patent is extended or adjusted under 35 U.S.C. 154(b) by 80 days.

(21) Appl. No.: 17/304,700

(22) Filed: Jun. 24, 2021

(65) Prior Publication Data

US 2021/0400918 A1 Dec. 30, 2021

Related U.S. Application Data

(60) Provisional application No. 62/705,415, filed on Jun. 25, 2020.

(51) Int. Cl.
*A01K 27/00* (2006.01)

(52) U.S. Cl.
CPC .......... *A01K 27/005* (2013.01); *A01K 27/001* (2013.01); *A01K 27/007* (2013.01)

(58) Field of Classification Search
CPC .... A01K 27/005; A01K 27/001; A01K 27/00; A44B 11/02; A44B 11/06; A44B 11/24; A44B 11/00
See application file for complete search history.

(56) References Cited

U.S. PATENT DOCUMENTS

| | | | |
|---|---|---|---|
| 3,708,838 A | 1/1973 | Gonzalez | |
| 3,994,265 A | 11/1976 | Banks | |
| 4,180,016 A | 12/1979 | George | |
| 4,426,957 A | 1/1984 | Horrigan | |
| 4,917,049 A | 4/1990 | Peterson | |
| 5,176,106 A | 1/1993 | Casto et al. | |
| 5,467,743 A | 11/1995 | Doose | |
| 5,701,849 A | 12/1997 | Suchowski et al. | |
| 5,791,297 A | 8/1998 | Mudge | |
| 6,125,793 A | 10/2000 | Petty | |
| 6,167,844 B1 | 1/2001 | Cantrell et al. | |
| 6,715,449 B1 | 4/2004 | Jordan | |
| 7,089,633 B2 | 8/2006 | Liu | |
| 8,522,728 B2 * | 9/2013 | Davis, Jr. | A44B 11/12 119/863 |
| 9,027,515 B2 | 5/2015 | Fidrych | |
| 9,072,279 B2 | 7/2015 | Davis, Jr. | |
| 2007/0006823 A1 | 1/2007 | Sandberg | |
| 2007/0199182 A1 | 8/2007 | Johnson | |

(Continued)

FOREIGN PATENT DOCUMENTS

| | | |
|---|---|---|
| CA | 2103827 A1 | 10/1994 |
| EP | 95870 B1 | 6/1986 |

(Continued)

OTHER PUBLICATIONS

International Search Report and Written Opinion for International Application No. PCT/US2021/038869, dated Oct. 21, 2021, 15 pages.

(Continued)

*Primary Examiner* — Kristen C Hayes
(74) *Attorney, Agent, or Firm* — Armstrong Teasdale LLP

(57) ABSTRACT

Described herein are animal collars and methods of using animal collars. Also described herein are buckles for animal collars.

18 Claims, 9 Drawing Sheets

(56) References Cited

U.S. PATENT DOCUMENTS

| | | | | |
|---|---|---|---|---|
| 2014/0224190 A1* | 8/2014 | Waters | ................. | A01K 27/005 |
| | | | | 24/492 |
| 2017/0202183 A1* | 7/2017 | Lou | ......................... | B32B 25/20 |
| 2017/0251640 A1 | 9/2017 | Eastman | | |
| 2018/0199548 A1 | 7/2018 | Jones | | |
| 2020/0315139 A1* | 10/2020 | Chelle | ................. | A01K 27/005 |

FOREIGN PATENT DOCUMENTS

| | | |
|---|---|---|
| EP | 338821 B1 | 6/1994 |
| GB | 2227400 A | 8/1990 |

OTHER PUBLICATIONS

Written Opinion of International Preliminary Examining Authority for International Application No. PCT/US2021/038869, dated May 9, 2022, 9 pages.

* cited by examiner

ANIMAL COLLAR INCLUDING BUCKLE AND METHOD OF USING SAME

CROSS-REFERENCE TO RELATED APPLICATIONS

This application claims the benefit of U.S. Provisional Application Ser. No. 62/705,415 filed Jun. 25, 2020, entitled "ANIMAL COLLAR INCLUDING BUCKLE AND METHOD OF USING SAME," which is incorporated herein by reference in its entirety.

FIELD

The present disclosure relates generally to animal collars and, more particularly, to animal collars including buckles that allow non-deformable release of the collar when subjected to a force exceeding a threshold force.

BACKGROUND

Animal collars include buckles, latches, or other means for securing the collar around an animal's neck. At least some animal collars are configured to be released from an animal's neck, for example, when the collar becomes entangled with a foreign object (e.g., a tree branch) to prevent injury to the animal. Such collars, also known as break-away animal safety collars, typically include non-releasable buckles and rely on lines of weakness along the belt of collar to enable the collar to be released from an animal's neck. Such collars are thus designed to break when subjected to a force exceeding the force necessary to activate the lines of weakness, thereby rendering the collar unusable.

The present disclosure provides reusable animal collars that improve safety. These animal collars can be loosened by animals that are entangled. The collars provide continuous protection by allowing the collars to remain intact but loosening sufficiently when necessary to provide safety to the animal.

The benefits of the present application are numerous and include reusability of collars, continuous protection of animals, and reduction in losses of collars.

BRIEF DESCRIPTION OF THE DISCLOSURE

In one aspect, an animal collar includes a belt extending from a first end to a second end, and a buckle connected to the first end of the belt. The buckle includes a body and a deflectable tab connected to the body. The body defines a passage extending therethrough for receiving the second end of the belt therein. The deflectable tab is configured to deflect towards and away from the passage, and includes a tooth that extends into the passage for engagement with the belt. The tab is biased towards an initial, undeflected position such that, when the second end of the belt is inserted into the passage, the tooth exhibits a frictional force on the belt sufficient to inhibit sliding of the belt up to a threshold force applied to the belt.

In another aspect, a method of using an animal collar including a belt extending from a first end to a second end, and a buckle connected to the first end of the belt is provided. The buckle includes a body and a deflectable tab connected to the body. The body defines a passage extending therethrough for receiving the second end of the belt therein. The deflectable tab includes a tooth that extends into the passage for engagement with the belt. The method includes positioning the animal collar around a neck of an animal, and inserting the second end of the belt into the passage of the buckle such that the belt deflects the deflectable tab away from the passage and the tooth engages the belt and exhibits a frictional force on the belt sufficient to inhibit sliding of the belt up to a threshold force applied to the belt.

In another aspect, a buckle for an animal collar includes a body defining a passage extending therethrough for receiving an end of a belt therein, and a deflectable tab connected to the body. The deflectable tab is configured to deflect towards and away from the passage, and includes a tooth that extends into the passage for engagement with the belt. The tab is biased towards an initial, undeflected position such that, when the belt is inserted into the passage, the tooth exhibits a frictional force on the belt sufficient to inhibit sliding of the belt up to a threshold force applied to the belt.

DETAILED DESCRIPTION

The present disclosure provides improved safety animal collars. For example, animal collars of the present disclosure can be loosened or released when subjected to a threshold force, without permanently deforming or destroying the animal collar. The collars of the present disclosure can thereby be re-used, even after being released when an animal becomes entangled with a foreign object, such as a tree branch. The benefits of the present application are numerous and include reusability of collars, continuous protection (e.g., from fleas, ticks, etc.) of animals, and reduction in losses of collars. Animal collars of the present disclosure are suitable for use with a variety of animals, particularly household pets including, for example and without limitation, cats and dogs.

An animal collar according to the present disclosure includes a belt extending from a first end to a second end and a buckle connected to the first end of the belt. The buckle includes a body defining a passage that extends therethrough for receiving the second end of the belt therein. The buckle also includes a deflectable tab connected to the body and configured to deflect towards and away from the passage. The deflectable tab includes a tooth that extends into the passage for engagement with the belt. The tab is biased towards an initial, undeflected position such that, when the second end of the belt is inserted into the passage, the tooth exhibits a frictional force on the belt sufficient to inhibit sliding of the belt up to a threshold force applied to the belt.

Figure 1:
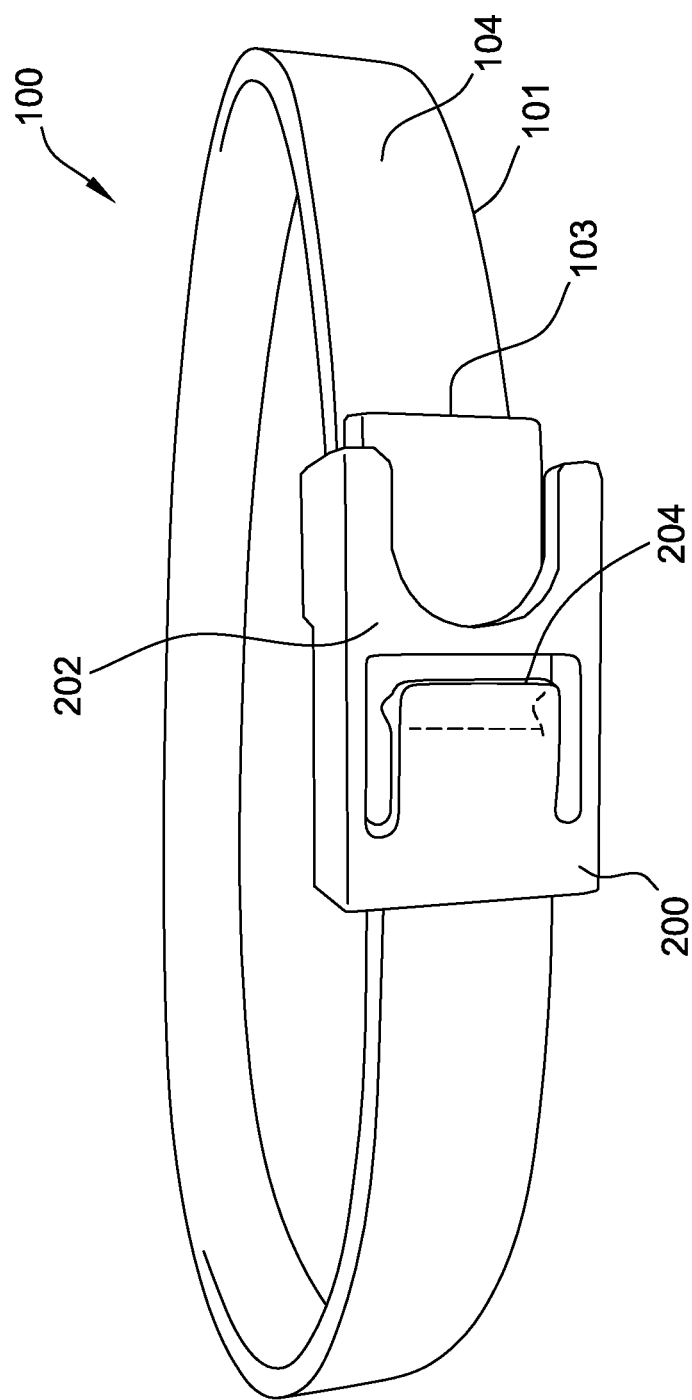
FIG. 1 is a perspective view of an exemplary animal collar including a belt and a buckle.
Figure 2:
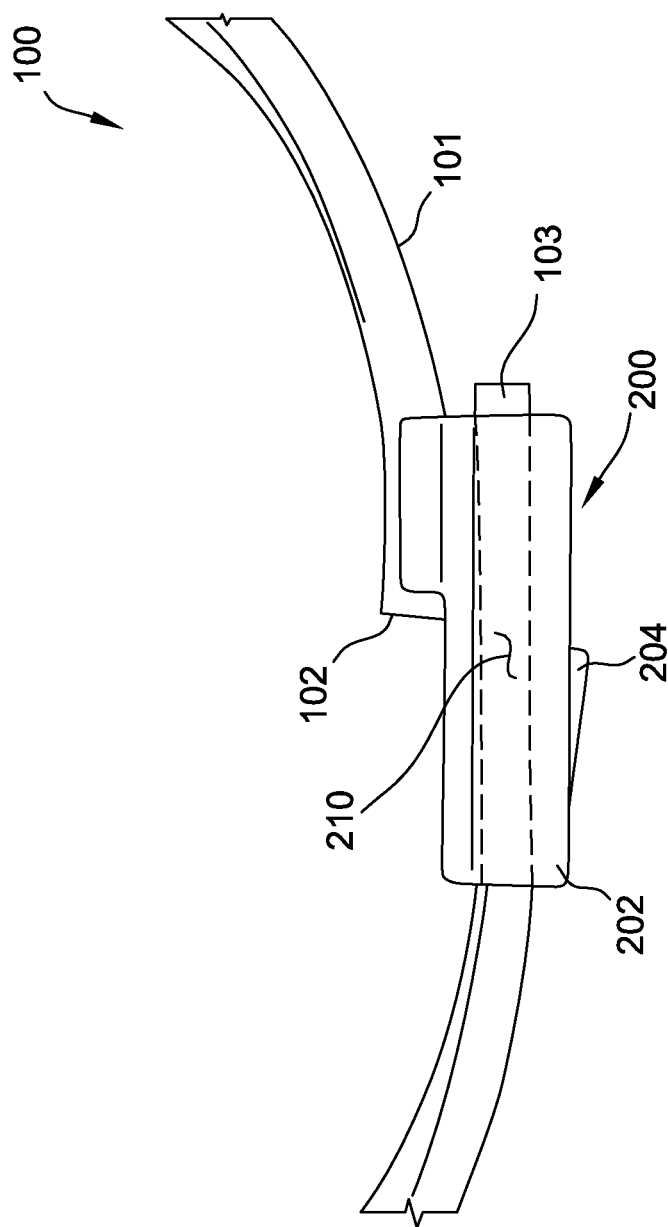
FIG. 2 is an enlarged view of a portion of the animal collar of FIG. 1, illustrating a deflectable tab of the buckle in a raised or deflected position.
Figure 3:
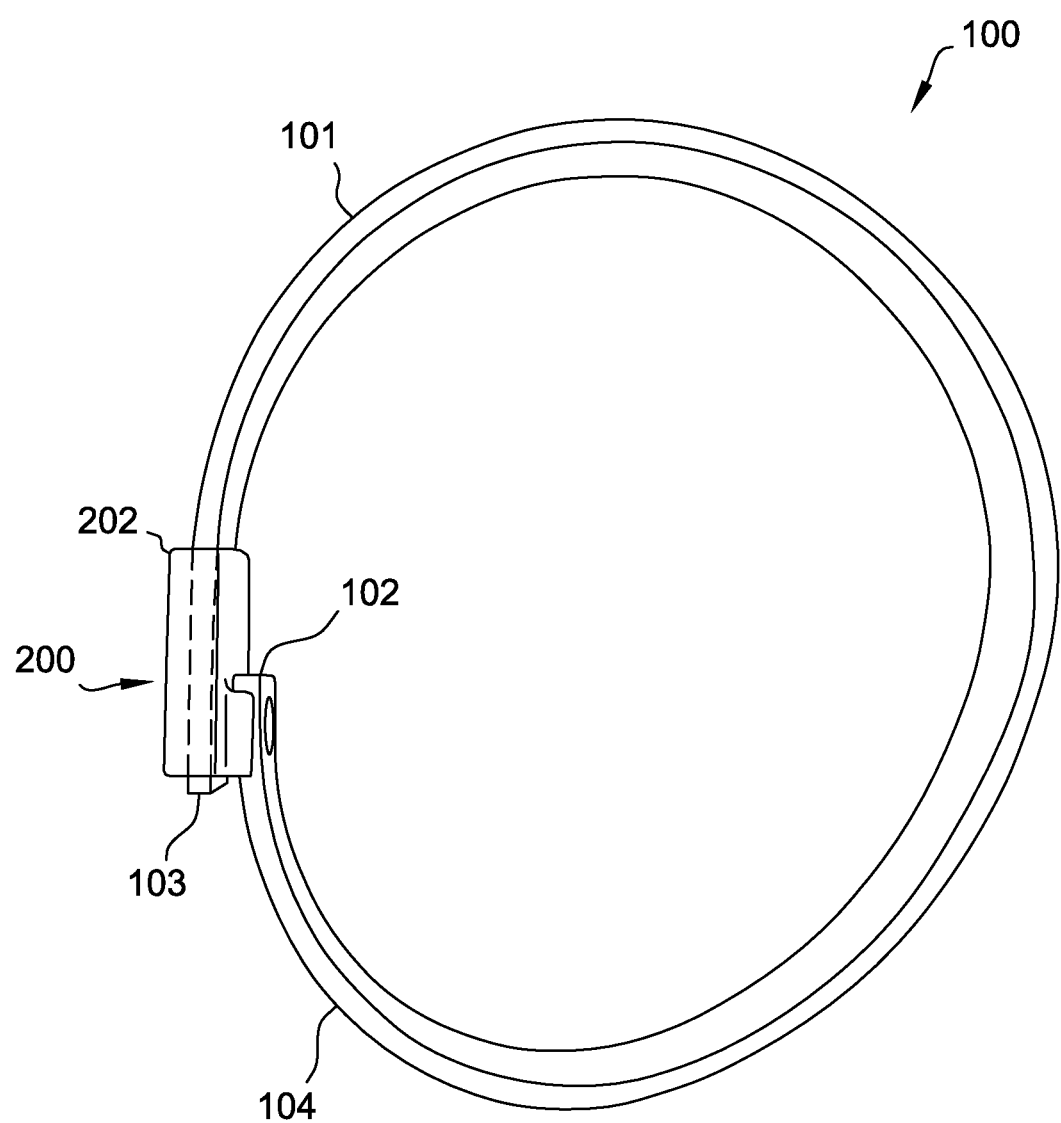
FIG. 3 is a side view of the animal collar of FIG. 1.

Referring now to the drawings, FIG. 1 is a perspective view of an exemplary animal collar 100. FIG. 2 is an enlarged view of a portion of the animal collar 100 illustrated in FIG. 1, and FIG. 3 is a side view of the animal collar 100 shown in FIG. 1. As illustrated in FIGS. 1-3, the animal collar 100 generally includes a belt 101 and a buckle 200 connected to the belt 101. The belt 101 extends from a first end 102 to a second end 103. The belt 101 has a rectangular cross-section in the illustrated embodiment, although the belt 101 may have a cross-sectional shape other than rectangular in other embodiments. The belt 101 can be constructed from a variety of suitable materials including, for example and without limitation, plastic (e.g., extruded plastic), rubber, fabric, and combinations thereof. In some embodiments, the belt 101 has a continuously smooth outer surface 104 from the second end 103 of the belt 101 to at least a midpoint between the first end 102 and the second end 103 of the belt 101. As illustrated, for example in FIGS. 1 and 3, the belt 101 of the exemplary embodiment has a continuously smooth outer surface 104 from the first end 102 to the second end 103. That is, the outer surface 104 of the belt 101 is free of bumps, protrusions, ridges, tabs, textures, or other features that would otherwise be configured for locking engagement with a coupler. Additionally, as illustrated in FIGS. 1 and 3, the belt 101 is free of lines of weakness, such as perforated lines, score lines, rupture lines, and frangible lines. In other embodiments, the belt 101 may include bumps, protrusions, ridges, tabs, textures, and similar features, and/or include one or more lines of weakness.

Figure 4:
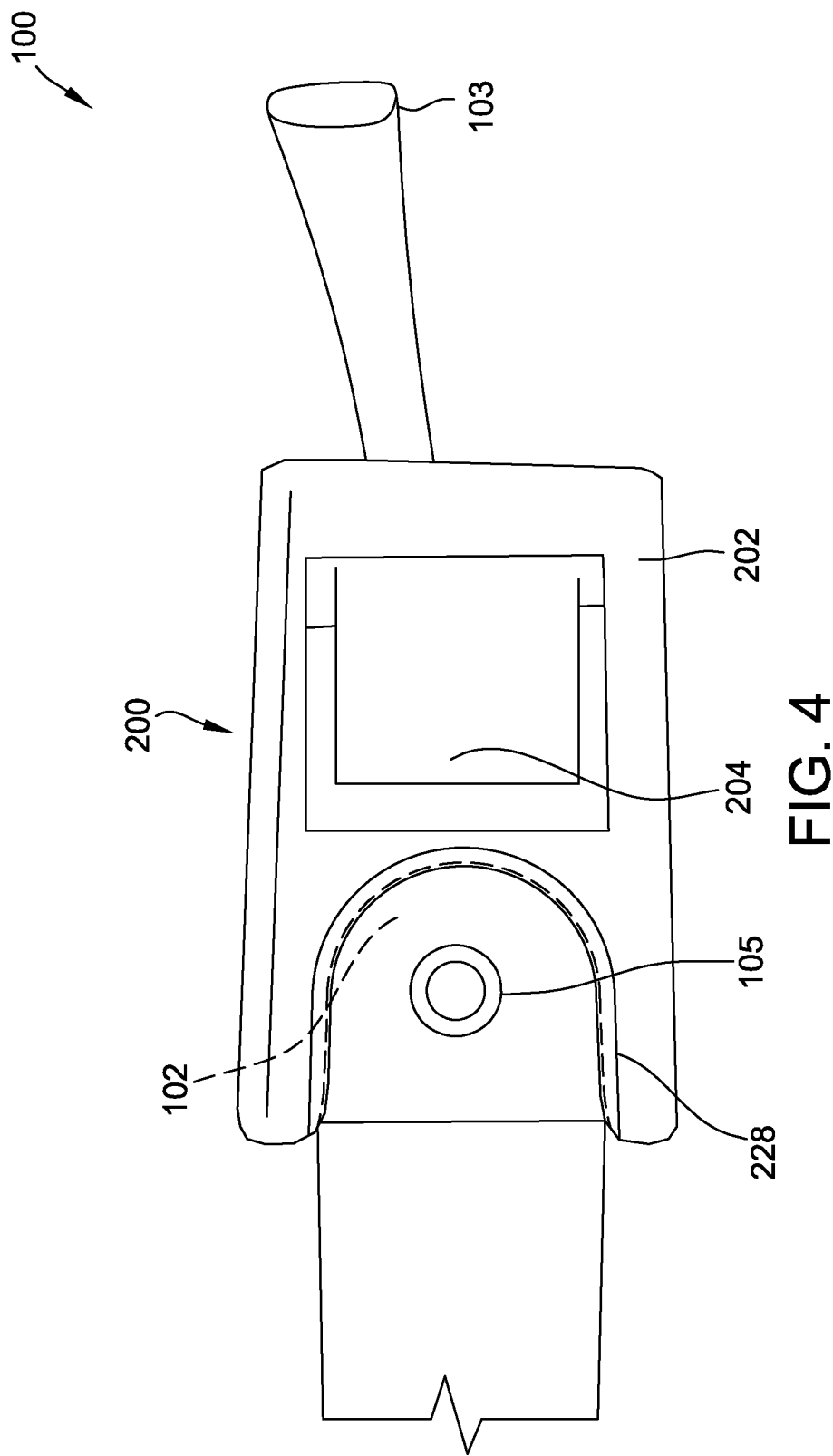
FIG. 4 is a top view of the buckle of the animal collar of FIG. 1.
Figure 5:
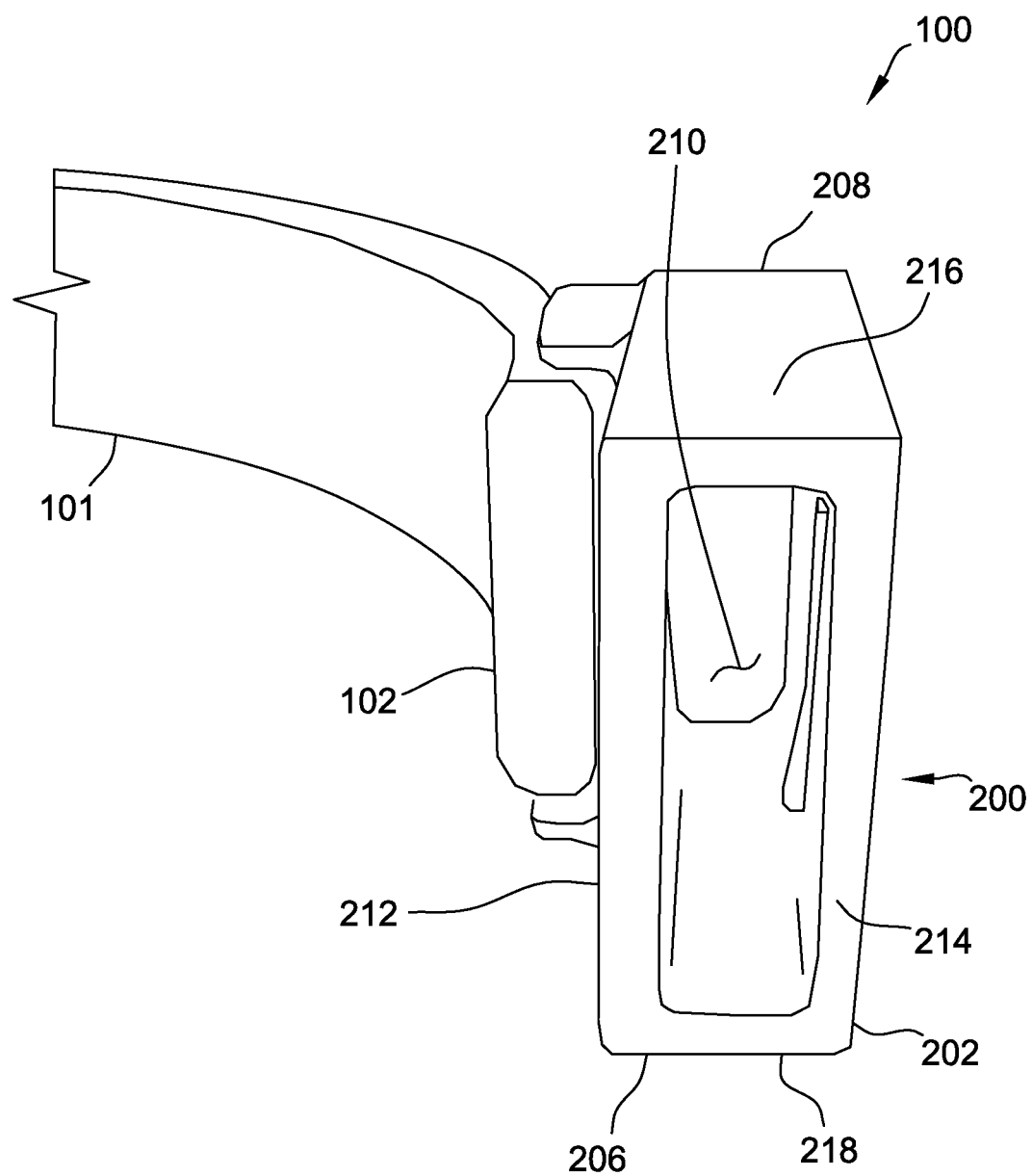
FIG. 5 is an end view of the buckle of the animal collar of FIG. 1.
Figure 6:
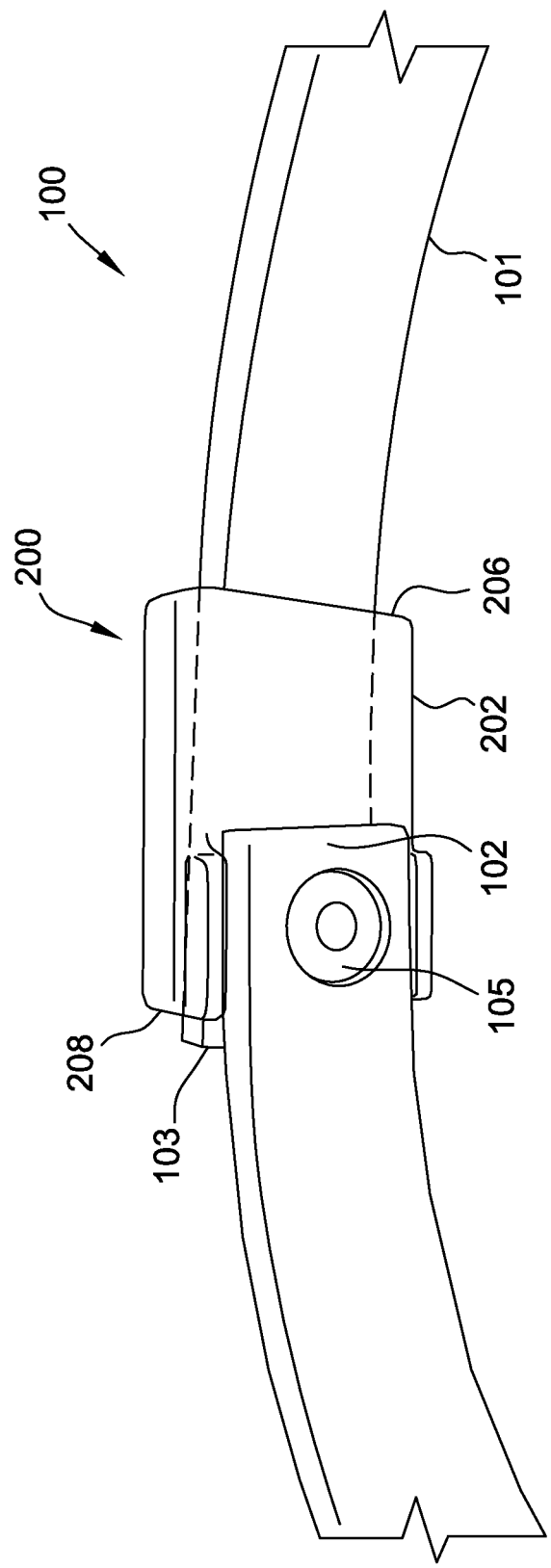
FIG. 6 is a rear view of the buckle of the animal collar of FIG. 1, illustrating the buckle connected to a second end of the belt.
Figure 7:
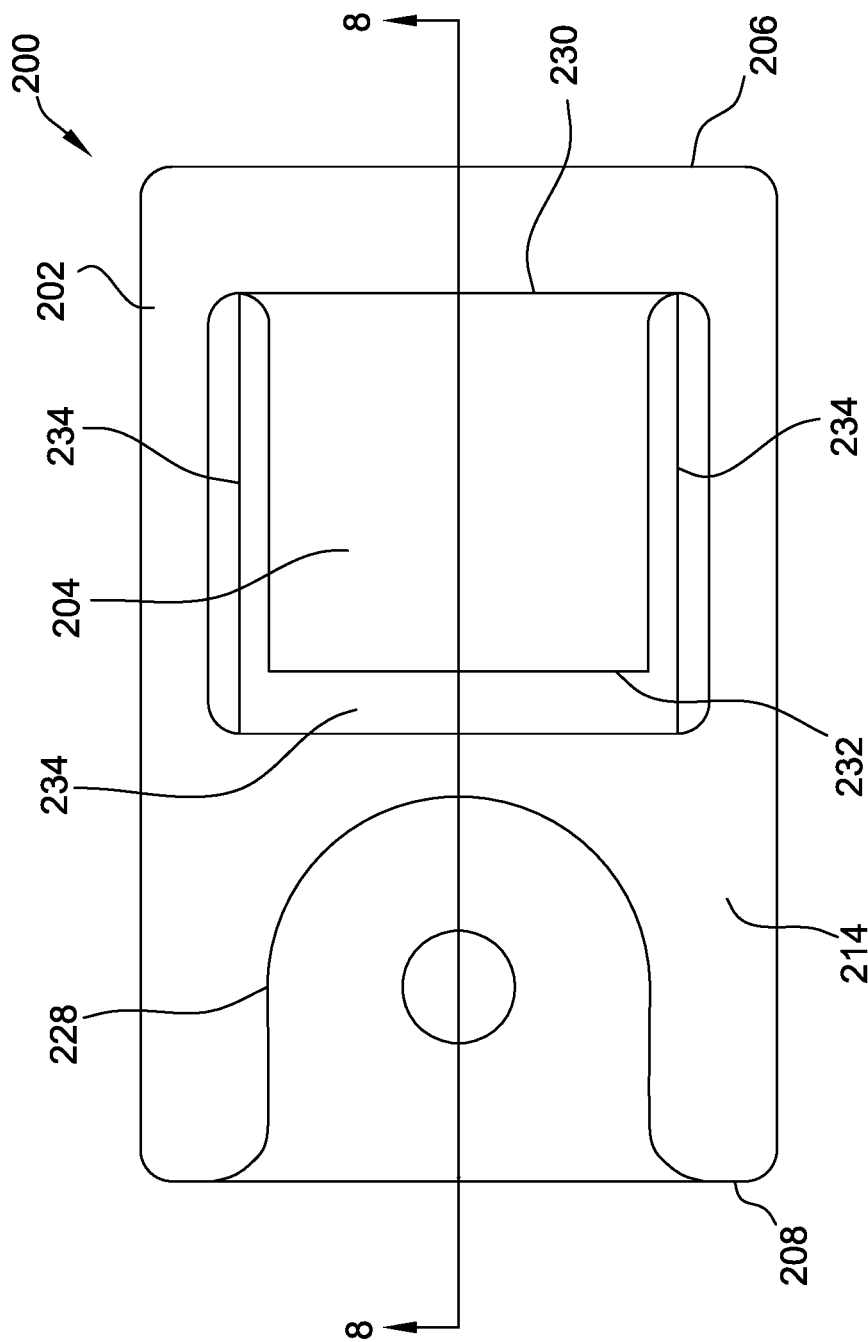
FIG. 7 is a top view of the buckle of the animal collar of FIG. 1 disconnected from the belt of the animal collar.

The buckle 200 is connected to one end of the belt 101 (the first end 102 in the illustrated embodiment), and includes a body 202 and a deflectable tab 204 connected to the body 202. The buckle 200 can be connected to the belt 101 using any suitable connection or fastening means, including, for example and without limitation, adhesives, mechanical fasteners (e.g., rivets, grommets, hooks, buttons, snaps, clips), thermal fastening (e.g., thermal bonding), integral formation (e.g., cast or molded as a unitary piece) and combinations thereof. In the illustrated embodiment, the buckle 200 is connected to the belt 101 by a grommet 105 (shown in FIGS. 4 and 6). In some embodiments, the buckle 200 is connected to the belt 101 by a monolithic connection (i.e., the two components are integrally formed with one another). The buckle 200 may be constructed from a variety of suitable materials including, for example and without limitation, plastic (e.g. high density polyethylene), metal, rubber, and combinations thereof.

In some embodiments, the buckle 200 and belt 101 are formed with a process selected from injection molding, extrusion, three-dimensional printing, textile manufacturing, and combinations thereof. In some embodiments, the buckle 200 and belt 101 are each constructed from a material selected from the group consisting of plastic, high-density polyethylene, fabric, and combinations thereof.

With additional reference to FIGS. 5-8, the buckle body 202 extends from a first, entry end 206 to a second, exit end 208, and defines a longitudinal passage 210 extending therethrough for receiving the second end 103 of the belt 101 therein. The deflectable tab 204 is deflectable towards and away from the passage 210 defined by the body 202. More specifically, the deflectable tab 204 is deflectable from an initial, undeflected position (shown in FIG. 8), to a second, deflected position (shown in FIG. 2) upon insertion of the belt 101 into the passage 210.

Figure 8:
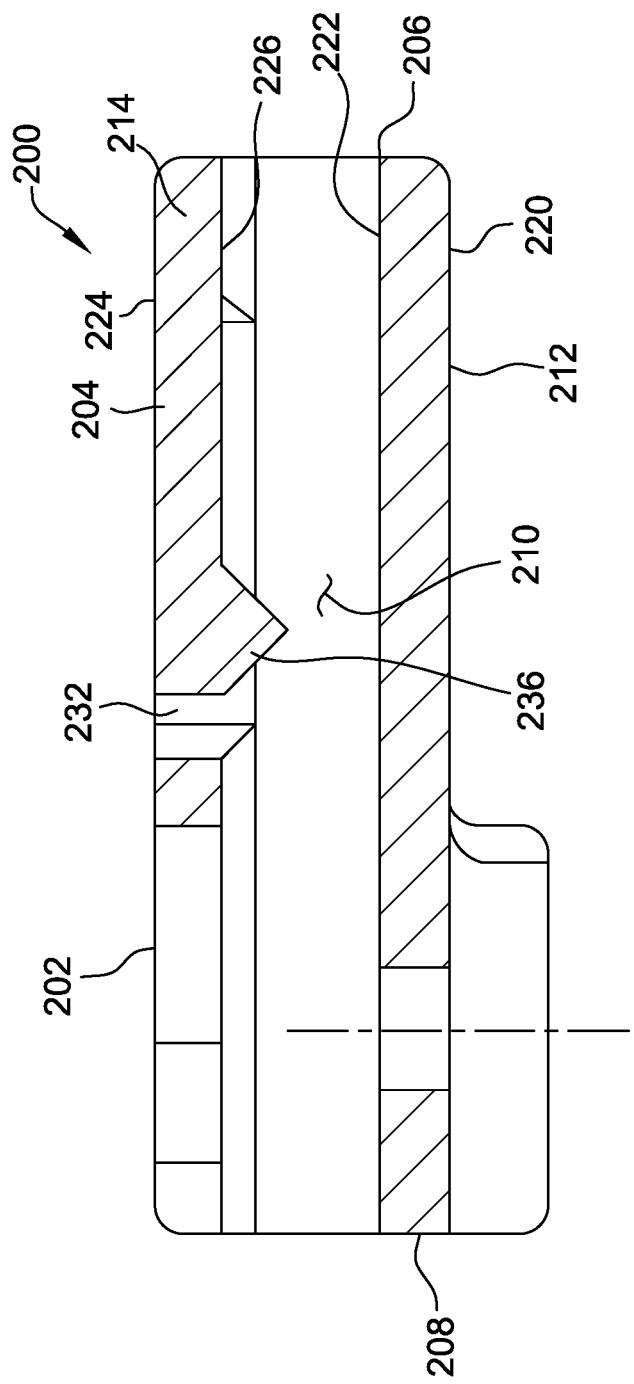
FIG. 8 is a cross-section of the buckle of FIG. 7 taken along line "8-8" in FIG. 7.

In the exemplary embodiment, the buckle body 202 has a generally rectangular cross-section, and includes a radial inner wall 212, a radial outer wall 214, and first and second opposing sidewalls 216, 218 extending from the radial inner wall 212 to the radial outer wall 214. As shown in FIG. 8, the radial inner wall 212 includes an exterior surface 220 and an interior surface 222, and the radial outer wall includes an exterior surface 224 and an interior surface 226. The interior surfaces 222, 226 of the radial inner wall 212 and the radial outer wall 214 partially define the passage 210. The belt 101 (specifically, the first end 102 of the belt 101) is connected to one of the exterior surfaces 220, 224 of the radial inner wall 212 and the radial outer wall 214. In the exemplary embodiment, the first end 102 of the belt 101 is connected to the exterior surface 220 of the radial inner wall 212. As noted above, the first end 102 of the belt 101 may be connected to one of the exterior surfaces 220, 224 using any suitable connection or fastening means, including, for example and without limitation, adhesives, mechanical fasteners (e.g., rivets, grommets, hooks, buttons, snaps, clips), thermal fastening (e.g., thermal bonding), integral formation (e.g., cast or molded as a unitary piece) and combinations thereof. Additionally, in the illustrated embodiment, the buckle 200 includes an arcuate cutout 228 in the radial outer wall 214 that extends longitudinally inward into the buckle body 202 from the exit end 208. The arcuate cutout 228 facilitates with assembly of the exemplary collar 100, specifically to enable the grommet 105 to fasten the buckle 200 to the belt 101.

The passage 210 has a cross-sectional size and shape complementary to that of the second end 103 of the belt 101. In the illustrated embodiment, the passage 210 has a rectangular cross-section, and has a cross-sectional area approximately equal to the cross-sectional area of the belt 101. Additionally, the passage 210 has a length (measured from the entry end 206 of the buckle body 202 to the exit end 208) that is generally greater than a width (measured from the first sidewall 216 to the second sidewall 218) of the passage 210. In some embodiments, the length of the passage 210 is at least two times greater than the width of the passage 210.

The tab 204 is connected to the body 202 along a resilient hinge 230 to allow the tab 204 to deflect relative to the buckle body 202. The tab 204 extends from the resilient hinge 230 to a distal, free end 232. In the exemplary embodiment, the tab 204 is formed integrally with the buckle body 202, and is defined by slits or cutouts 234 in the buckle body 202 that allow the tab 204 to flex or deflect relative to the buckle body 202 when subjected to a force. The tab 204 is biased towards its initial, undeflected position due to the inherent elasticity of the material from which the buckle 200 is formed. In other embodiments, a biasing element, such as a spring (not shown) may be connected to the tab 204 and/or the buckle body 202 to bias the tab 204 towards the initial, undeflected position.

As shown in FIG. 8, the deflectable tab 204 includes a tooth 236 that extends or projects into the passage 210 for engagement with the belt 101 (specifically, the second end 103 of the belt 101). In the illustrated embodiment, the tooth 236 is located at the distal, free end 232 of the tab 204, although in other embodiments the tooth 236 may be located other than at the distal, free end 232. Additionally, the illustrated buckle 200 includes a single tooth 236 that extends across the entire width of the tab 204. In other embodiments, the buckle 200 may include more than one tooth 236 located on the tab 204. In some embodiments, for example, the tooth 236 may be separated by one or more breaks to define multiple teeth that engage the belt 101 when inserted into the passage 210.

The tab 204 is biased towards its initial, undeflected position such that, when the second end 103 of the belt 101 is inserted into the passage 210, the tooth 236 exhibits a frictional force on the belt 101 sufficient to inhibit sliding of the belt 101 up to a threshold force applied to the belt 101. For example, in the illustrated embodiment, the second end 103 of the belt 101 is insertable into the passage 210 in a first direction, specifically into the entry end 206 of the buckle 200. When the belt 101 engages the tooth 236 of the deflectable tab 204, the belt 101 pushes the deflectable tab 204 in a radially outward direction, causing the tab 204 to deflect in a radially outward direction. The deflectable tab 204 is biased towards the belt 101 (i.e., in a radially inward direction), due the inherent resiliency of the buckle material in the exemplary embodiment. Consequently, the tooth 236 exerts a retention force against the belt 101, thereby creating a frictional force between the tooth 236 and the belt 101 that inhibits sliding of the belt 101 in a second direction, opposite the first direction. The force necessary to overcome the frictional force between the belt 101 and the tooth 236 is referred to herein as the "threshold" or "release" force. As will be appreciated by one of skill in the art, the collar 100, once the second end 103 of the belt 101 is inserted into the passage 210 and engages the tooth 236, will generally maintain its size and shape until subjected to a force that exceeds the threshold force. As a result, the animal collar 100 can be attached to and worn by an animal, and automatically released if the animal becomes entangled with a foreign object, such as a tree branch.

The threshold force needed to release the belt 101 from the buckle 200 is a function of the retention force exerted by the tooth 236 on the belt 101, and the coefficient of friction between the tooth 236 and the portion of the belt 101 (e.g., the second end 103 of the belt 101) that engages the tooth 236. Thus, the threshold or releasing force of the collar 100 can be varied by adjusting one or both of the retention force and the coefficient of friction between the tooth 236 and the belt 101. For example, if a greater threshold force is desired (e.g., for large animals), the retention force and/or the coefficient of friction can be increased. If a smaller threshold force is desired (e.g., for small animals), the retention force and/or the coefficient of friction can be reduced.

One of skill in the art will appreciate that either or both of the retention force and the coefficient of friction can be adjusted to vary the threshold force needed to release the belt 101 from the buckle 200. For example, the retention force exerted by the tooth 236 on the belt 101 is a function of, among other things, the biasing force on the tab 204 (e.g., the elasticity of the material from which the buckle 200 is formed), the distance between the tooth 236 and the resilient hinge 230 that connects the tab 204 to the buckle body 202, and the height of the tooth 236 (i.e., the distance the tooth 236 projects into the passage 210). The coefficient of friction can be adjusted, for example, by selecting materials for the belt 101 and the tooth 236 having a higher or lower coefficient of friction, and/or adding a texture to the belt 101 and/or the tooth 236 to increase friction between the two materials.

In general, the threshold force is sufficient to prevent sliding of the belt 101 relative to the buckle 200 in the absence of the application of force. In some embodiments, the threshold force needed to release the belt 101 from the buckle 200 is less than twenty pounds. In some embodiments, the threshold force is less than eighteen pounds. In some embodiments, the threshold force is less than sixteen pounds. In some embodiments, the threshold force is less than fourteen pounds. In some embodiments, the threshold force is less than twelve pounds. In some embodiments, the threshold force is less than ten pounds. In some embodiments, the threshold force is less than eight pounds. In some embodiments, the threshold force is less than six pounds. In some embodiments, the threshold force is less than four pounds. In some embodiments, the threshold force is less than two pounds. In some embodiments, the threshold force is at least ten pounds. In some embodiments, the threshold force is at least eight pounds. In some embodiments, the threshold force is at least four pounds. In some embodiments, the threshold force is at least two pounds.

Figure 9:
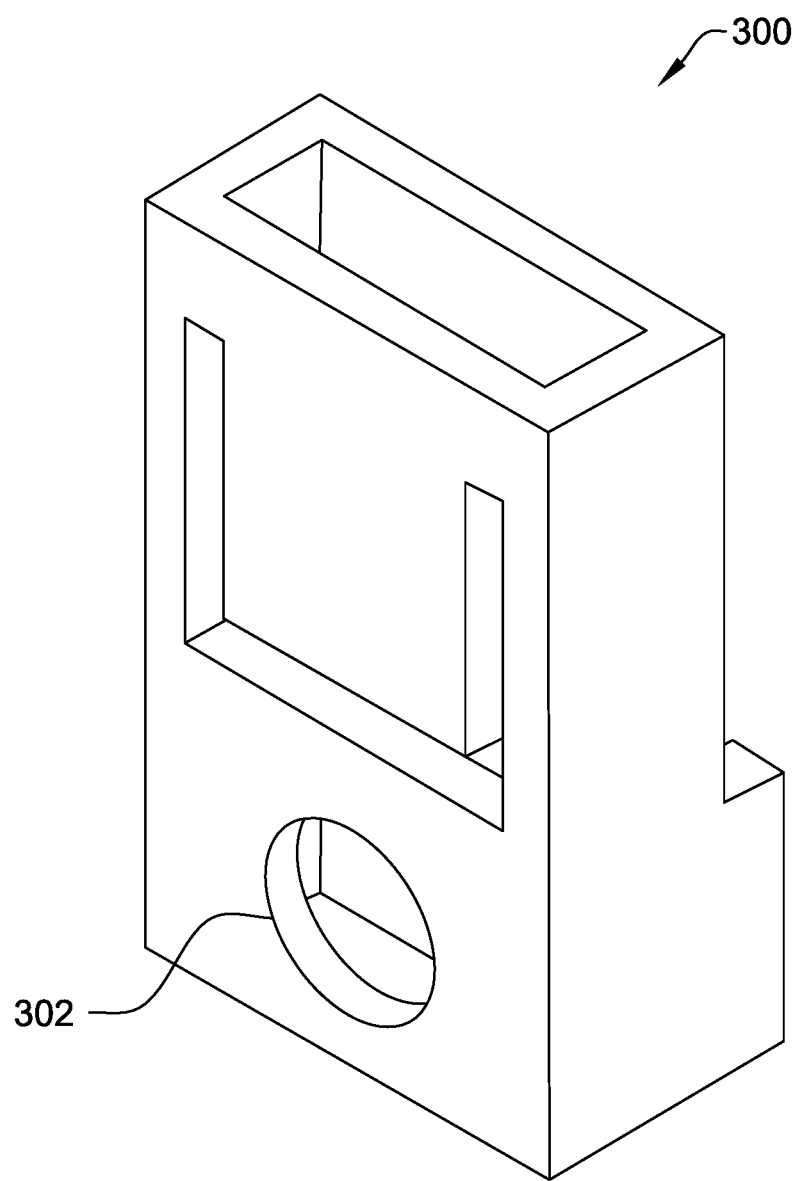
FIG. 9 is a perspective view of another embodiment of a buckle suitable for use with the animal collar of FIG. 1.

FIG. 9 is a perspective view of another embodiment of a buckle 300 suitable for use with the collar 100 of FIG. 1. The buckle 300 is substantially identical to the buckle 200 illustrated in FIGS. 1-8 except the buckle 300 includes a circular cutout 302 instead of the arcuate cutout 228 illustrated in FIG. 7.

The animal collar 100 of the present disclosure is particularly suited for use as a flea and/or tick collar or similar type of collar. In some embodiments, for example, the animal collar is impregnated with at least one chemical substance selected from the group consisting of pesticides, hormones, pheromones, interomones, and combinations thereof. In some embodiments, the pesticide is selected from the group consisting of acaricides, pyrethroids, neonicotinoids, infant growth regulators, organophosphates, and combinations thereof. In some embodiments, the pesticide is a pyrethroid selected from alpha-Cypermethrin, beta-Cyfluthrin, Bifenthrin, Cyfluthrin, Cypermethrin, Cyphenothrin, d-Allethrin, d-phenothrin, Deltamethrin, Esfenvalerate, Etofenprox, Fenpropathrin, Fenvaleratre, Flucythrinate, Flumethrin, gamma-Cyhalothrin, Imiprothrin, lambda-Cyhalothrin, Metofluthrin, Momfluorothrin, Permethrin, Prallethrin, Resmethrin, Silafluofen, Sumithrin, tau-Fluvalinate, Tefluthrin, Tetramethrin, Tralomethrin, transfluthrin, zeta-Cypermethrin, and combinations thereof. In some embodiments, the pesticide is a pyrethroid selected from Deltamethrin, Flumethrin, and combinations thereof. In some embodiments, the pesticide is a neonicotinoid selected from imidacloprid, acetamiprid, clothianidin, nitenpyram, nithiazine, thiacloprid, thiamethoxam, and combinations thereof. In some embodiments, the pesticide is imidacloprid. In some embodiments, the pesticide is an infant growth regulator (IGR) selected from s-methoprene, diflubenzuron, azadirachtin, hydroprene, pyriproxyfen, triflumuron, and combinations thereof. In some embodiments, the pesticide is s-methoprene. In some embodiments, the pesticide is an organophosphate selected from parathion, malathion, methyl parathion, chlorpyrifos, diazinon, dichlorvos, phosmet, fenitrothion, tetrachlorvinphos, azamethiphos, azinphos-methyl, terbufos, and combinations thereof. In some embodiments, the pesticide is Tetrachlorvinphos. In some embodiments, the pesticide comprises Deltamethrin, Flumethrin, imidacloprid, s-methoprene, Tetrachlorvinphos, and combinations thereof. In some embodiments, the hormone is selected from eicosanoids, steroids, amino acid and protein derivatives, and combinations thereof. In some embodiments, the pheromone is selected from androstenone, 2-methylbut-2-enal, quinolone, quinoline, androstenol, androstadienone, estratetraenol, and combinations thereof. In some embodiments, the interomone is selected from androstenone, 2-methylbut-2-enal, and combinations thereof.

As used herein, "interomone" means any naturally secreted or synthetically produced chemical released by one species, which, when administered to a member of a different vertebrate species, elicits a change in behavior or physiology of the different species with or without providing a benefit or harm to the species from which the chemical is released.

As used herein, "pheromone" means any naturally secreted or synthetically produced chemical released by a species, which, when administered to another member of the same species, elicits a change in behavior or physiology of the same species.

In use, the animal collar 100 is positioned around the neck of an animal, such as a cat or a dog. The second end 103 of the belt 101 is inserted into the passage 210 of the buckle such that the belt 101 deflects the deflectable tab 204 away from the passage 210 and the tooth 236 engages the belt 101 and exhibits a frictional force on the belt 101 sufficient to inhibit sliding of the belt 101 up to a threshold force applied to the belt 101. The belt 101 can be selectively adjusted relative the buckle 200 such that the diameter of the collar 100 is sized appropriately for the animal's neck. The belt 101 can subsequently be withdrawn the passage 210 by applying a force to the belt 101 that exceeds the threshold force (e.g., when the collar 100 becomes entangled or snared on a foreign object). The belt 101 may be withdrawn from the passage 210 without permanently deforming any part of the animal collar 100.

Animal collars of the present disclosure provide several advantages over prior animal safety collars. For example, animal collars disclosed herein provide a safety buckle that automatically releases the collar when subjected to a threshold force without permanently deforming or destroying the collar. As a result, animal collars of the present disclosure can be re-used, even after being automatically released. Additionally, animal collards of the present disclosure allow a size of the collar to be easily and readily adjusted, without the use of snaps or fasteners to secure the collar in place.

Although the embodiments and examples disclosed herein have been described with reference to particular embodiments, it is to be understood that these embodiments and examples are merely illustrative of the principles and applications of the present disclosure. It is therefore to be understood that numerous modifications can be made to the illustrative embodiments and examples and that other arrangements can be devised without departing from the spirit and scope of the present disclosure as defined by the claims. Thus, it is intended that the present application cover the modifications and variations of these embodiments and their equivalents.

This written description uses examples to disclose the invention, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An animal collar comprising:
    a belt extending from a first end to a second end, wherein an outer surface of the belt is continuously smooth from the second end of the belt to at least a midpoint between the first end and the second end of the belt; and
    a buckle connected to the first end of the belt, wherein the buckle comprises:
        a body defining a passage extending therethrough for receiving the second end of the belt therein; and
        a deflectable tab connected to the body and configured to deflect towards and away from the passage, wherein the deflectable tab comprises a tooth that extends into the passage for engagement with the belt, wherein the tab is biased towards an initial, undeflected position such that, when the second end of the belt is inserted into the passage, the tooth exhibits a frictional force on the belt sufficient to inhibit sliding of the belt up to a threshold force applied to the belt, wherein the belt is automatically releasable from the buckle when a force in excess of the threshold force is applied to the belt.

2. The animal collar of claim 1, wherein a diameter of the animal collar is adjustable.

3. The animal collar of claim 1, wherein the belt is free of lines of weakness.

4. The animal collar of claim 1, wherein the second end of the belt is insertable into the passage in a first direction, and wherein the deflectable tab inhibits sliding of the belt in a second direction opposite the first direction.

5. The animal collar of claim 1, wherein the threshold force is about four pounds.

6. The animal collar of claim 1, wherein the body further comprises a radial inner wall and a radial outer wall, each of the radial inner and outer walls including an exterior surface and an interior surface that partially defines the passage, wherein the first end of the belt is connected to the exterior surface of one of the radial inner wall and the radial outer wall.

7. The animal collar of claim 6, wherein the first end of the belt is connected to the exterior surface by at least one of adhesives, rivets, grommets, hooks, buttons, snaps, clips, and combinations thereof.

8. The animal collar of claim 6, wherein the first end of the belt is connected to the exterior surface by a monolithic connection.

9. The animal collar of claim 1, wherein the passage has a cross-section sized and shaped complementary to a cross-section of the second end of the belt.

10. The animal collar of claim 1, wherein the animal collar is impregnated with at least one chemical substance selected from the group consisting of pesticides, hormones, pheromones, interomones, and combinations thereof.

11. The animal collar of claim 10, wherein the pesticide is selected from the group consisting of acaricides, pyrethroids, neonicotinoids, infant growth regulators, organophosphates, and combinations thereof.

12. The animal collar of claim 1, wherein the buckle and belt are formed separately.

13. The animal collar of claim 1, wherein the buckle and belt are each constructed from a material selected from the group consisting of plastic, high-density polyethylene, fabric, and combinations thereof.

14. A method of using an animal collar comprising a belt extending from a first end to a second end, and a buckle connected to the first end of the belt, wherein an outer surface of the belt is continuously smooth from the second end of the belt to at least a midpoint between the first end and the second end of the belt, wherein the buckle comprises a body and a deflectable tab connected to the body, wherein the body defines a passage extending therethrough for receiving the second end of the belt therein, and wherein the deflectable tab comprises a tooth that extends into the passage for engagement with the belt, the method comprising:

positioning the animal collar around a neck of an animal; and inserting the second end of the belt into the passage of the buckle such that the belt deflects the deflectable tab away from the passage and the tooth engages the belt and exhibits a frictional force on the belt sufficient to inhibit sliding of the belt up to a threshold force applied to the belt; and withdrawing the belt from the passage by applying a force to the belt that exceeds the threshold force.

15. The method of claim 14, wherein withdrawing the belt from the passage comprises withdrawing the belt from the passage without permanently deforming any part of the animal collar.

16. A buckle for an animal collar, the buckle comprising:
a body defining a passage extending therethrough for receiving an end of a belt therein; and
a deflectable tab connected to the body and configured to deflect towards and away from the passage, wherein the deflectable tab comprises a tooth that extends into the passage for engagement with the belt and extends across an entire width of the tab, wherein the tab is biased towards an initial, undeflected position such that, when the belt is inserted into the passage, the tooth exhibits a frictional force on the belt sufficient to inhibit sliding of the belt up to a threshold force applied to the belt, wherein the belt is automatically releasable from the buckle when a force in excess of the threshold force is applied to the belt.

17. The buckle of claim 16, wherein a length of the passage is at least two times greater than a width of the passage.

18. The buckle of claim 16, wherein the passage has a cross-sectional area approximately equal to the cross-sectional area of the belt.

* * * * *